UNITED STATES PATENT OFFICE.

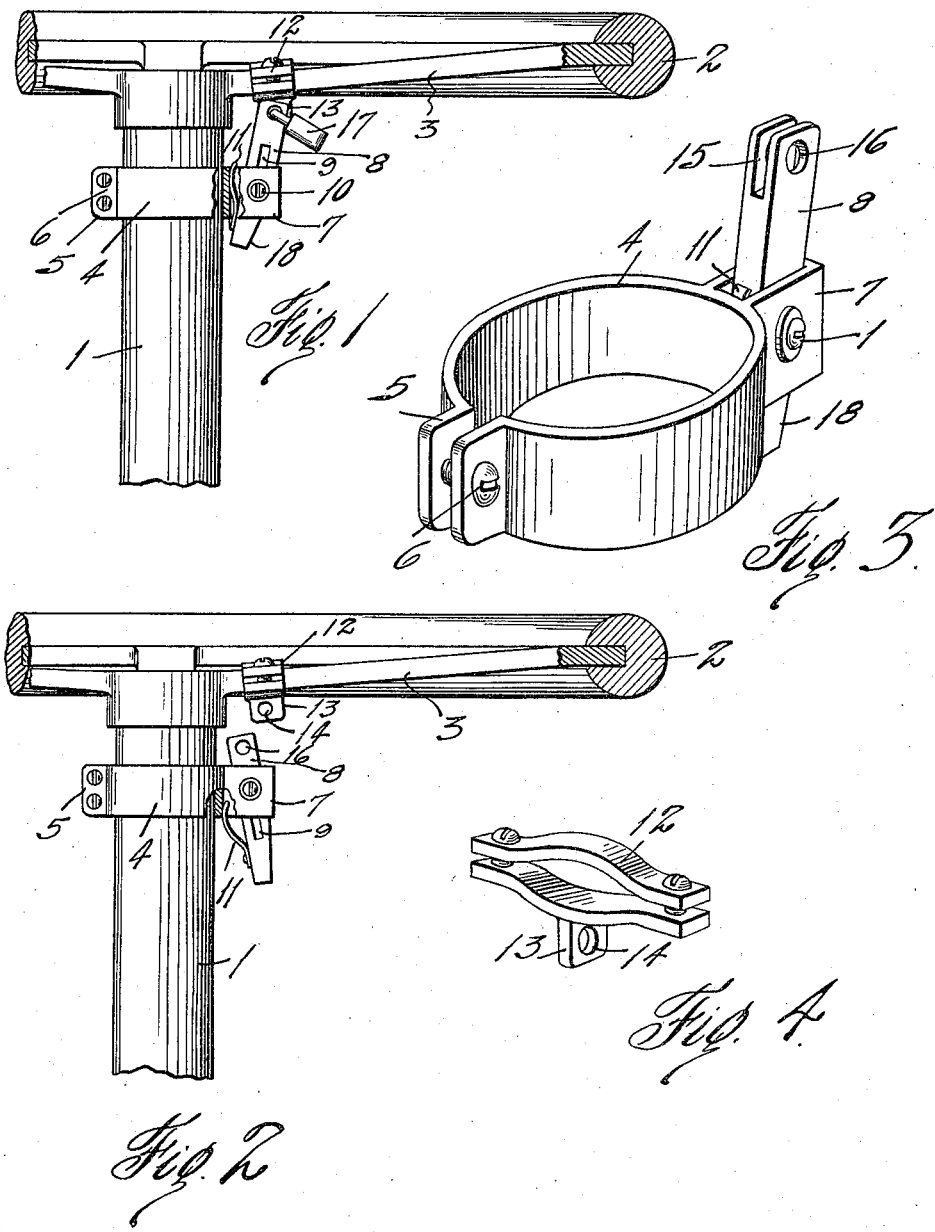

JESSE L. CRAWFORD AND JACK R. DUNLAP, OF DALLAS, TEXAS.

LOCKING DEVICE.

1,300,348.

Specification of Letters Patent. Patented Apr. 15, 1919.

Application filed August 13, 1918. Serial No. 249,751.

*To all whom it may concern:*

Be it known that we, JESSE L. CRAWFORD and JACK R. DUNLAP, citizens of the United States, residing at Dallas, in the county of Dallas and State of Texas, have invented certain new and useful Improvements in Locking Devices, of which the following is a specification.

This invention relates to new and useful improvements in locking devices for motor vehicle steering wheels.

In carrying out the invention a collar is mounted on the steering column while a keeper is mounted on the steering wheel. A latch member is slidably mounted on the collar so as to be moved upward into an engagement with the keeper and locked thereto and also to be slid downward out of the path of the keeper. A particular feature is the provision of a spring member attached to the latch for holding the same in position and preventing it from rattling.

The invention will be more readily understood from a reading of the following specification and by reference to the accompanying drawings, in which an example of the invention is illustrated, and wherein—

Figure 1 is a view of a steering wheel and its column, showing the locking device in position thereon and the wheel locked against operation, Fig. 2 is a similar view, showing the latch withdrawn from the keeper, Fig. 3 is a perspective view of the collar and latch, and Fig. 4 is a perspective view of the keeper.

In the drawings the numeral 1 designates a steering column, 2 a steering wheel and 3 one of the spokes of the wheel.

In constructing the device a split collar 4 is provided with upturned ears 5 and positioned on the column 1 below the steering wheel. A bolt 6 is fastened through the ears and binds the collar in position on the post. Opposite the ears the collar is provided with an outwardly projecting integral housing 7. A latch bar 8 is slidable through this housing and is provided with a vertical slot 9 receiving a bolt 10 which is fastened transversely of the housing. By reason of the slot and bolt the bar is confined in the housing, but has a limited vertical movement as well as a swinging movement.

The bar does not fill the housing but carries a curved leaf spring 11 which bears against the collar and holds the bar in the position to which it is moved either in its upper position, as shown in Fig. 1, or in its lower position, as shown in Fig. 2. While the bar may be freely moved it cannot rattle or swing idly.

A clamp 12 is fastened transversely of the spoke 3 and has a depending keeper 13 provided with an aperture 14. The bar 8 has a slot 15 at its upper end for receiving the keeper and is provided with an aperture 16 positioned to register with the aperture 14 so that the hasp of a padlock 17 may be fastened through all of the apertures, thus locking the steering wheel against rotation. The lower end of the bar 8 may be reduced at 18 so that the bar may be more freely swung when moved at its upward position.

Normally the latch bar is pushed downward and held in position by the spring 11, as shown in Fig. 2. This permits the steering wheel 2 to be freely rotated as is evident. When it is desired to lock the wheel the bar 8 is pushed upward and the keeper received in the slot 15 so that the apertures 14 and 16 register. This is easily accomplished as the bar may be swung on its pivot. The hasp of the lock 17 is engaged in the apertures and the wheel locked.

What we claim is,

In a locking device for steering wheels, a split collar adapted to be fastened on the steering-wheel column of a motor vehicle, a housing formed integral with the collar and having its outer end closed, a latch bar slidable in the housing and having a limited swinging movement therein, said bar having an elongated slot, a transverse pin in the housing passing through the slot of the latch bar, a flat spring mounted on the bar and engaging the collar within the housing and forcing the bar against the closed end of the housing to retain the bar in vertically adjusted positions, a keeper adapted to be mounted on a steering-wheel, the upper end of the bar engaging the keeper, and a lock having a hasp passed the keeper and the bar.

In testimony whereof we affix our signatures.

JESSE L. CRAWFORD.
JACK R. DUNLAP.

Copies of this patent may be obtained for five cents each, by addressing the "Commissioner of Patents, Washington, D. C."